US007526076B2

(12) United States Patent
Koch

(10) Patent No.: US 7,526,076 B2
(45) Date of Patent: Apr. 28, 2009

(54) AUDIO DELIVERY OF CALLER IDENTIFICATION INFORMATION

(75) Inventor: Robert A. Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 145 days.

(21) Appl. No.: 10/109,752

(22) Filed: Mar. 29, 2002

(65) Prior Publication Data

US 2004/0037403 A1 Feb. 26, 2004

(51) Int. Cl.
H04M 1/56 (2006.01)
(52) U.S. Cl. .......................... 379/142.06; 379/142.15; 379/142.17
(58) Field of Classification Search ............ 379/142.01, 379/142.16, 142.04, 142.05, 142.06, 142.07, 379/142.15, 142.17, 67.1, 88.19, 88.21, 88.25, 379/211.02; 455/415, 417
See application file for complete search history.

(56) References Cited

U.S. PATENT DOCUMENTS

| | | | |
|---|---|---|---|
| 4,935,951 A | 6/1990 | Robinson et al. | |
| 4,993,058 A | 2/1991 | McMinn et al. | |
| 5,012,507 A | 4/1991 | Leighton et al. | |
| 5,161,180 A | 11/1992 | Chavous | |
| RE34,677 E | 7/1994 | Ray et al. | |
| 5,511,111 A | 4/1996 | Serbetcioglu et al. | |
| 5,526,406 A | 6/1996 | Luneau | |
| 5,572,576 A | 11/1996 | Klausner et al. | |
| 5,621,379 A | 4/1997 | Collins | |
| 5,673,304 A | 9/1997 | Connor et al. | |
| 5,724,412 A * | 3/1998 | Srinivasan | 379/93.23 |
| 5,796,806 A | 8/1998 | Birckbichler | |
| 5,805,587 A | 9/1998 | Norris et al. | |
| 5,883,942 A | 3/1999 | Lim et al. | |
| 5,940,474 A | 8/1999 | Ruus | |
| 5,940,475 A | 8/1999 | Hansen | |
| 6,009,148 A | 12/1999 | Reeves | |
| 6,011,473 A | 1/2000 | Klein | |
| 6,104,800 A * | 8/2000 | Benson | 379/215.01 |
| 6,144,644 A | 11/2000 | Bajzath et al. | |
| 6,208,718 B1 | 3/2001 | Rosenthal | |
| 6,208,726 B1 | 3/2001 | Bansal et al. | |
| 6,215,993 B1 | 4/2001 | Ulveland | |
| 6,219,413 B1 | 4/2001 | Burg | |
| 6,259,692 B1 | 7/2001 | Shtivelman | |

(Continued)

OTHER PUBLICATIONS

U.S. Appl. No. 11/318,110, filed Dec. 2005.

(Continued)

Primary Examiner—Barry W Taylor
(74) Attorney, Agent, or Firm—Scott P. Zimmerman, PLLC

(57) ABSTRACT

Systems, methods, and apparatuses are disclosed for announcing audio caller identification information to a PC or other IP communications device connected with a telecommunications network. A calling party dials a called telephone number and an incoming communications signal is detected, decoded, and used to generate a data message that associates a selection of announcement fields and/or files with the incoming communications signal in the telecommunications network. The telecommunications network transmits the data message and the incoming communications signal to the called telephone number. The PC or IP communications device associated with the called telephone number receives the data message. The data message is deciphered, associated with locally stored announcement fields and/or files, and otherwise transformed to play the audio caller identification announcement.

15 Claims, 11 Drawing Sheets

U.S. PATENT DOCUMENTS

| | | | |
|---|---|---|---|
| 6,307,920 B1 | 10/2001 | Thomson et al. | |
| 6,310,946 B1 | 10/2001 | Bauer et al. | |
| 6,343,115 B1 * | 1/2002 | Foladare et al. | 379/88.17 |
| 6,347,136 B1 | 2/2002 | Horan | |
| 6,356,756 B1 | 3/2002 | Koster | |
| 6,434,126 B1 | 8/2002 | Park | |
| 6,476,763 B2 | 11/2002 | Allen, Jr. | |
| 6,529,500 B1 | 3/2003 | Pandharipande | |
| 6,529,726 B1 | 3/2003 | Rhodes | |
| 6,603,977 B1 | 8/2003 | Walsh et al. | |
| 6,608,886 B1 | 8/2003 | Contractor | |
| 6,622,016 B1 | 9/2003 | Sladek et al. | |
| 6,624,754 B1 | 9/2003 | Hoffman et al. | |
| 6,661,785 B1 | 12/2003 | Shang et al. | |
| 6,665,388 B2 * | 12/2003 | Bedingfield | 379/142.01 |
| 6,665,611 B1 | 12/2003 | Oran et al. | |
| 6,674,745 B1 | 1/2004 | Schuster et al. | |
| 6,678,357 B2 | 1/2004 | Stumer et al. | |
| 6,680,998 B1 | 1/2004 | Bell et al. | |
| 6,703,930 B2 | 3/2004 | Skinner | |
| 6,714,637 B1 * | 3/2004 | Kredo | 379/215.01 |
| 6,718,021 B2 * | 4/2004 | Crockett et al. | 379/93.23 |
| 6,724,872 B1 | 4/2004 | Moore et al. | |
| 6,771,742 B2 | 8/2004 | McCalmont et al. | |
| 6,792,081 B1 | 9/2004 | Contractor | |
| 6,804,338 B1 | 10/2004 | Chen | |
| 6,816,481 B1 | 11/2004 | Adams et al. | |
| 6,842,448 B1 | 1/2005 | Norris et al. | |
| 6,868,074 B1 | 3/2005 | Hanson | |
| 6,912,399 B2 | 6/2005 | Zirul et al. | |
| 6,931,117 B2 | 8/2005 | Roberts et al. | |
| 6,940,950 B2 | 9/2005 | Dickinson et al. | |
| 7,149,208 B2 * | 12/2006 | Mattaway et al. | 370/352 |
| 7,254,219 B1 * | 8/2007 | Hansen et al. | 379/88.17 |
| 2002/0072348 A1 | 6/2002 | Wheeler et al. | |
| 2002/0160745 A1 | 10/2002 | Wang | |
| 2003/0211839 A1 | 11/2003 | Baum et al. | |
| 2003/0216148 A1 * | 11/2003 | Henderson | 455/514 |
| 2004/0037403 A1 | 2/2004 | Koch | |
| 2004/0057425 A1 | 3/2004 | Brouwer et al. | |
| 2004/0101123 A1 | 5/2004 | Garcia | |
| 2004/0140928 A1 | 7/2004 | Cleghorn | |
| 2005/0047574 A1 | 3/2005 | Reid | |
| 2005/0063519 A1 | 3/2005 | James | |
| 2005/0151642 A1 | 7/2005 | Tupler et al. | |
| 2005/0175166 A1 | 8/2005 | Welenson et al. | |
| 2005/0190750 A1 | 9/2005 | Kafka | |
| 2005/0190892 A1 | 9/2005 | Dawson et al. | |
| 2005/0232243 A1 | 10/2005 | Adamczyk | |
| 2005/0250468 A1 | 11/2005 | Lu | |

OTHER PUBLICATIONS

US 5,905,788, 05/1999, Bauer et al. (withdrawn)

* cited by examiner

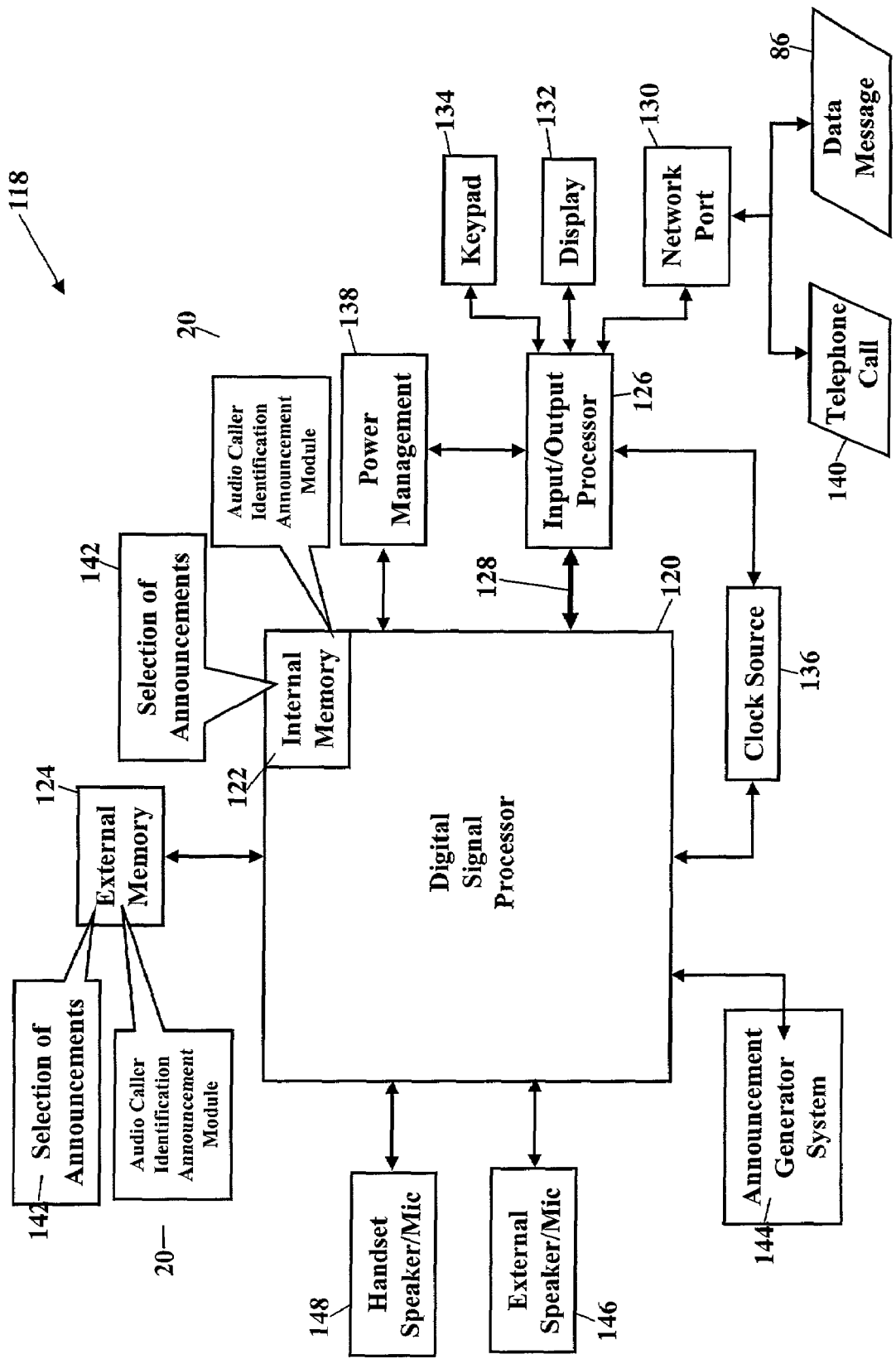

AUDIO DELIVERY OF CALLER IDENTIFICATION INFORMATION

CROSS REFERENCE

This application relates to applicant's co-pending U.S. patent application Ser. No. 10/113,189, entitled "Custom Ringtones for Wireline Telephones," filed simultaneously herewith and is incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of communications. More particularly, this invention relates to systems, methods, and apparatuses that provide audio delivery of caller identification information for incoming communications signals to a computer or another communications device having an Internet Protocol (IP) address associated with a called telephone number in a telecommunications network.

2. Description of the Related Art

Telecommunications has experienced explosive growth, and more growth is planned as telecommunication access and numerous communication devices improve. This explosive growth is revolutionizing special services offered to subscribing customers. Of the special service offerings, the most relevant to this invention is the caller identification or Caller ID service. A customer or a user of a telephone that is served by the Caller ID service is able to screen incoming calls by knowing what telephone number is calling before the user answers the phone. Presently available Caller ID systems provide a calling party's telephone number and a billing name associated with the calling party's telephone number (if available) when an incoming caller line identification (ICLID) signal can be detected, decoded, and transmitted to the serviced telephone or other display device associated with the serviced telephone. In recent years, telephony providers and manufacturers have tried to achieve vocalized announcement of the calling party's number and/or name to the serviced telephone.

For example, U.S. Pat. No. 5,526,406, entitled "Calling Party Announcement Apparatus," discloses a peripheral apparatus that captures the ICLID signal and audibly announces the caller's name or telephone number over the telephone receiver using synthesized speech. The called party can decide whether to accept or reject the call before the telephone company central office connects the two parties. Another example is U.S. Pat. No. 6,347,136 B1, entitled "Calling Party Announcement Message Management Systems and Methods," that discloses a method and apparatus for detecting and decoding an ICLID signal, comparing the decoded signal with one or more stored telephone numbers, and performing a function if there is a match with the stored telephone number. The functions include: (i) ignoring the telephone call (i.e., letting it ring through); (ii) playing one of an outgoing message from addressable memory and record a message; (iii) playing a pre-recorded audio signal from memory announcing the name associated with the calling number; (iv) displaying a visual message and telephone number; (v) answering and placing the call on-hold; or combinations thereof. Both the U.S. Pat. Nos. 5,526,406 and 6,347,136 B1 patents, however, have several drawbacks that include necessitating specialized peripheral hardware and equipment and limiting the audio announcement to only the name or the number of the calling party.

BRIEF SUMMARY OF THE INVENTION

This invention addresses the above needs by providing telephony network-based solutions that work in conjunction with a customer's (or a user's) personal computer (PC) or other communications devices having an IP address (hereinafter referred to as an "IP communications device") to audibly deliver caller identification information for incoming communications signals to a called telephone number in a telecommunications network, such as, for example, the Public Switched Telephone Network (PSTN).

This invention takes advantage of the growing number of telephone customers and/or users that have a PC or other IP communications device connected with the telecommunications network (e.g., via a Digital Subscriber Line). The calling party dials the called telephone number and the incoming communications signal is detected, decoded, and transformed into a data message that associates a selection of audio announcements or audio announcement fields with the incoming communications signal in the telecommunications network. The telecommunications network transmits the data message and the incoming communications signal to the called telephone number. A PC or IP communications device associated with the called telephone number receives the data message. The data message may be deciphered, associated with announcement fields and/or files, or transformed in order to play the audio caller identification announcement over the PC or IP communications device.

In an embodiment, the incoming communications signal is sent with the data message so that the customer may simultaneously answer the call and hear the audio caller identification announcement. In another embodiment, the data message is sent to the called telephone number, the PC or IP phone may decipher, associate fields and/or files, or otherwise transform the data message to play the audio caller identification announcement, and, thereafter, a preference function associated with the data message determines whether the incoming communications signal is also sent or connected with the called telephone number. For example, the customer may set the audio caller identification announcement to not play during the hours from 10:00 PM EST to 7:00 AM EST and further associate that the incoming communications signal should not be sent during those hours. Thus, the incoming data message could be deciphered, associated with announcement fields and/or files, and/or otherwise transformed to determine not to play the audio announcement, and thereafter the PC or IP communications device would transmit a reply data message to the telecommunications network (via a switch) to not link the incoming communications signal with the called telephone number. Thereafter, the incoming communications signal could be processed in a variety of ways by the telecommunications network (e.g., forward to voicemail, play a recorded message declining the call, etc.).

In another embodiment, the PC or IP communications device may be serviced by a separate telephone number from the communications device (e.g., telephone) servicing the called telephone number. In an alternated embodiment, the PC or IP communications device and the communications device (e.g., telephone) are connected to the same called telephone number.

In another embodiment, a method for providing audio delivery of caller identification information to a PC or other IP communications device includes detecting an incoming communications signal from a communications switch or other similar device in a telecommunications network to a called telephone number, processing the incoming communications signal to designate an originating telephone number associated with the incoming communications signal, comparing the originating telephone number with caller identification information and other data stored in a database in the telecommunications network, generating a data message associated with the caller identification information, and using the data message to generate an audio caller identification announcement over the PC or other IP communications device. If the PC/IP communications device and the called telephone number are serviced by different telephone numbers (or different Service Node addresses), then the method further includes mapping the called telephone number to the telephone number servicing the PC/IP communications device. In addition, the method may include performing a default function associated with the customer's selection of caller identification information and/or call-handling options based on the caller identification information.

In another embodiment, this invention makes use of a Caller Identification Information Module. The Caller Identification Information Module comprises computer programs, computer systems, and telecommunications systems that allow the user to customize audio announcements identifying incoming communications signals (e.g., an incoming call). The user may select a desired announcement based upon an originating telephone number, a name associated with the originating telephone number, a time of day, a date identifier (e.g., day of week or calendar date), a geographic identifier, and/or similar information associated with the ICLID signal. The desired announcement is then preferably presented on a computer or IP communications device to provide an audio announcement that can be heard by the customer (or other person in vicinity) of the incoming call. The Caller Identification Information Module provides a convenient and user-friendly web-interface that allows the customer to select audio announcements (e.g., audio announcement of name and time of day) and to specify the conditions for each announcement (e.g., play audio announcement during the hours of 8:30 AM EST thru 10:00 PM EST). The Caller Identification Information Module thus integrates telephony events with data network events (such as World-Wide-Web packetized messages).

In another embodiment, this invention includes a method of selecting an audio announcement to play on the PC or IP communications device. An incoming communications signal is detected and decoded from the originating telephone number to the called telephone number. An announcement is selected, and a data message is sent over a data network to the PC or IP communications device. The data message includes information associated with the selected caller identification announcement. The incoming communications signal is then connected to the called telephone number via a communications link to a connected communications device (e.g., a telephone).

Another embodiment describes a telecommunications system. The system includes a database and a telecommunications switch. The database stores audio announcements for PCs or other IP communications devices. The telecommunications switch establishes a connection to the called telephone number and transmits the incoming communication and the data message. The data message includes caller identification information associated with the desired announcement to accompany the telephone call so that the PC or IP communications device is able to play the audio announcement and so that the connected communications device (e.g., the customer answering the telephone can establish a voice connection with a calling party at the originating telephone number).

Another embodiment describes a method for selecting distinctive audio announcements. A data message is received from a data network. The data message includes information associated with a selected announcement for an incoming communication. The selected announcement is retrieved from memory and the associated audio caller identification information is presented/played on the PC or IP communications device.

Another embodiment describes an apparatus that generates or otherwise transforms the data message sent to the PC or IP communications device to an audible announcement that can be played by the PC or IP communications device. The apparatus includes a network port, a memory device, and a digital signal processor. The network port receives the data message from the telephone network. The memory device stores a selection of announcements to accompany the incoming communications signal. The digital signal processor communicates with the memory device and selects an announcement based upon information contained within the data message. The information contained within the data message could be associated with the announcement, and the announcement would be selected by a telecommunications system to accompany the incoming telephone call. The information contained within the data message could also be associated with telephone network information provided by the telecommunications system. After the announcement is selected and retrieved from the memory device, the apparatus could also include a system that plays the audio caller identification announcement to alert of the incoming call.

Another embodiment describes a system for selecting announcements. This system comprises a processor and a Caller Identification Information Module stored in memory. The Caller Identification Information Module receives the data message from the telecommunications network. The data message includes information that the Caller Identification Information Module uses to select an announcement to accompany the incoming call. Once the announcement is selected, the processor and the Caller Identification Information Module cooperate to present the selected announcement with the incoming call.

BRIEF DESCRIPTION OF THE DRAWINGS

The above and other embodiments, objects, uses, advantages, and novel features of this invention are more clearly understood by reference to the following description taken in connection with the accompanying figures, wherein:

FIG. 11 is a block diagram of an exemplary apparatus embodying this invention.

DETAILED DESCRIPTION OF THE INVENTION

Figure 1:
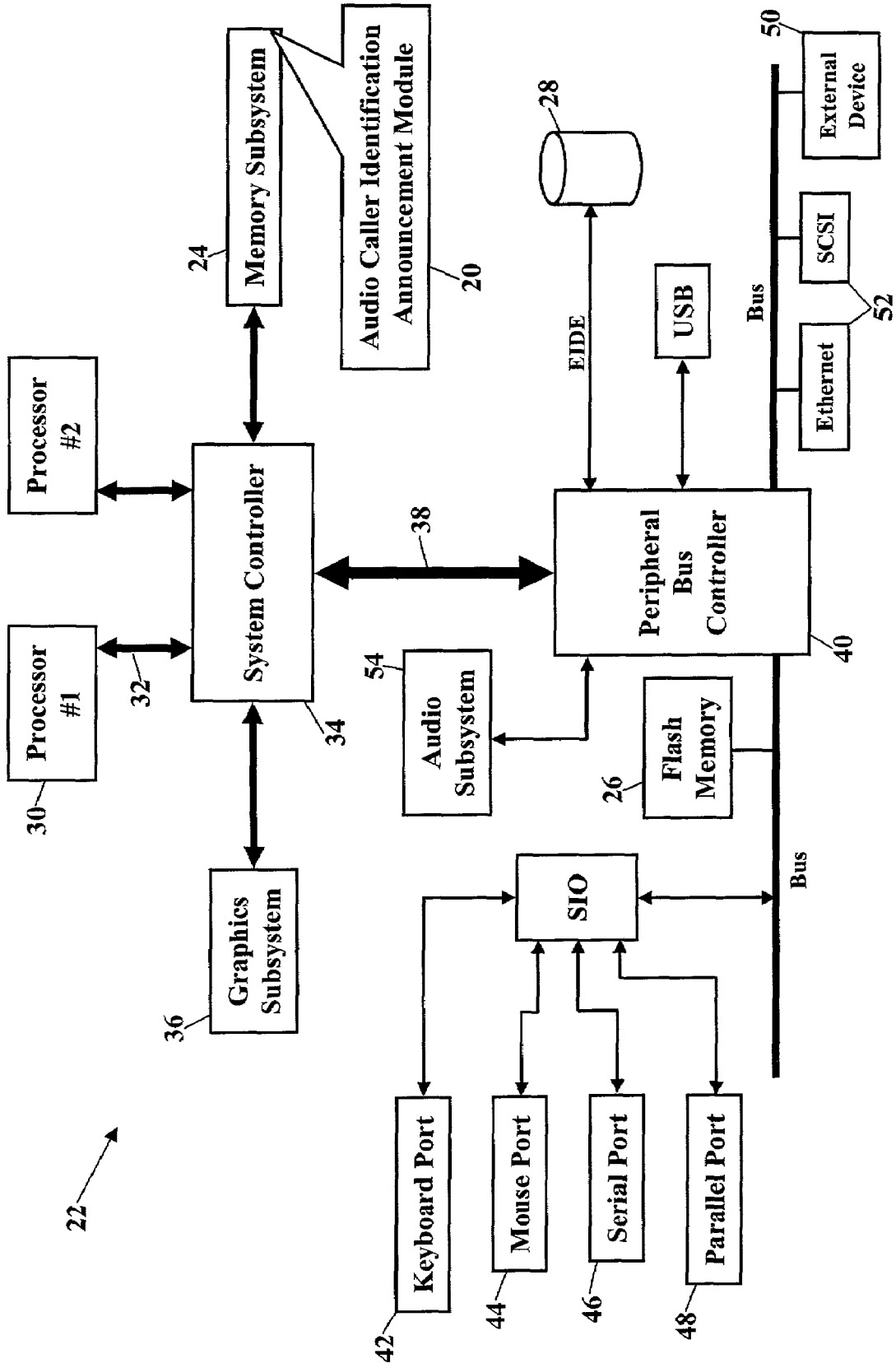
FIG. 1 is a block diagram showing of the Caller Identification Information Module that resides in a computer system according to an embodiment of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams, schematics, and the like represent conceptual views of illustrative circuitry embodying this invention. Similarly, it will be appreciated that any flow charts, flow diagrams, and the like represent various processes which may be substantially represented in computer readable medium and so executed by a computer or processor, whether or not such computer or processor is explicitly shown.

The functions of the various elements shown in the figures, including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those skilled in the art further understand that the exemplary hardware, software, processes, methods, and/or operating systems described herein are for illustrative purposes and, thus, are not intended to be limited to any particular named manufacturer.

In the claims hereof any element expressed as a means for performing a specified function is intended to encompass any way of performing that function including, for example, a combination of circuit elements which performs that function or software in any form, including firmware, microcode, or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Figure 2:
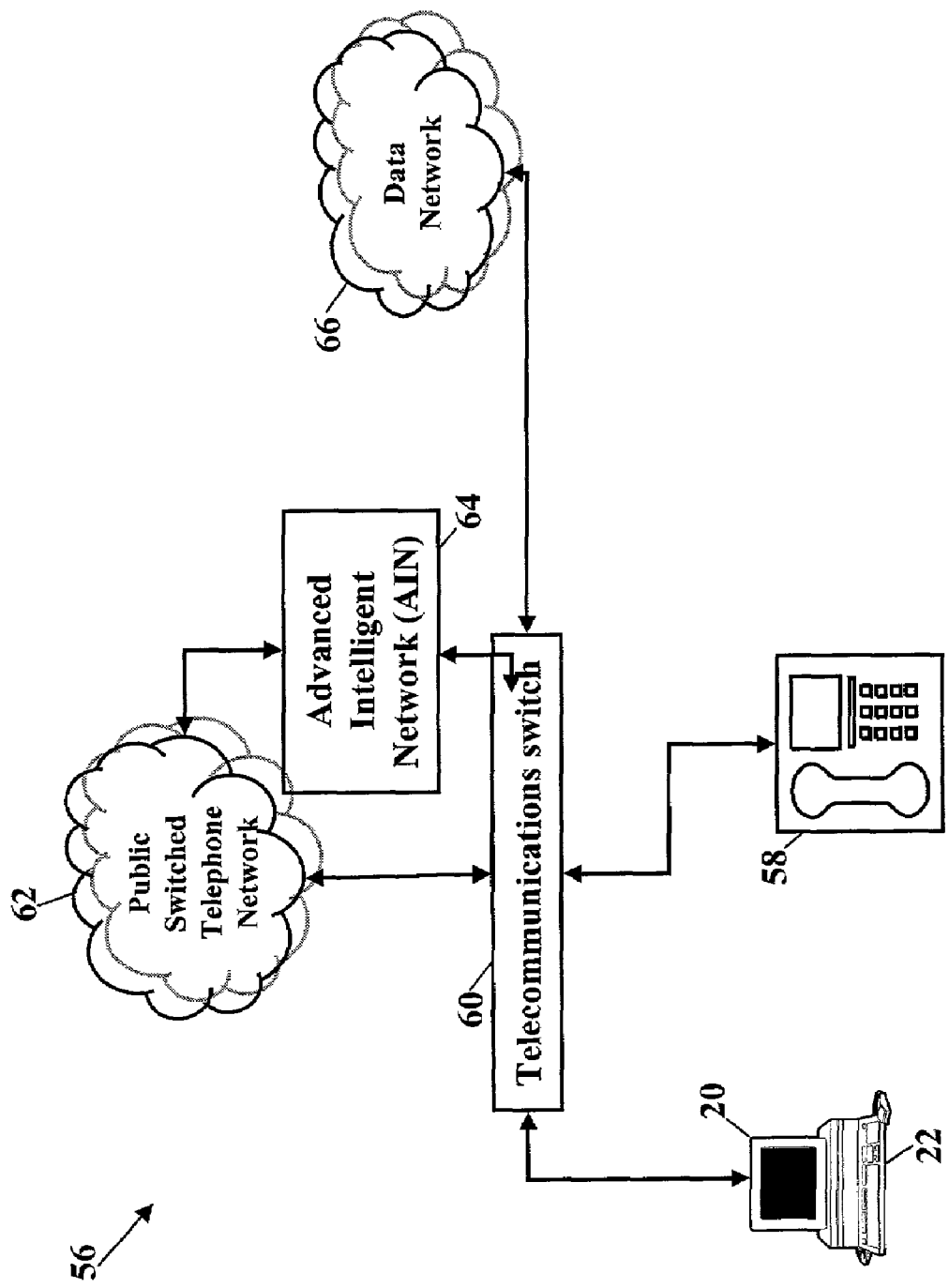
FIG. 2 is a schematic showing the Caller Identification Information Module operating within a telecommunications system according to an embodiment of this invention.

FIGS. 1 and 2 depict operating environments for embodiments of this invention. This embodiment of a Caller Identification Information Module 20 includes a computer program that allows a customer to customize audio caller identification announcements presented by a PC or IP communications device servicing a called telephone number (or to a Service Node address). As used herein, the term "IP communications device" includes a wireless phone, a cellular phone, a satellite phone, a computer, a modem, an audio pager, a personal digital assistant, a digital signal processor, a global positioning system transceiver, an interactive television, and other IP addressable communications devices capable of delivering audio communications. The Caller Identification Information Module allows the customer to select a desired announcement based upon a variety of caller identification information fields associated with the ICLID signal that are typically accessible in a telecommunications network 62. For example, the caller identification fields may include information associated with at least one of the following: an originating telephone number, a name associated with the originating telephone number, a time of day, a date identifier (e.g., day of week or calendar date), a geographic identifier, and/or similar information associated with the ICLID signal. The selected announcement typically includes an audible sounds, such as synthesized speech or a recorded announcement (e.g., the customer may record customized announcements, store, and associate with the caller identification information sent in a data message from the telecommunications network) that may accompany an incoming call (i.e., an incoming communications signal). When an incoming call is transmitted to the called telephone number, the selected announcement is audibly delivered to computer or other IP communications device.

FIG. 1 is a block diagram showing the Caller Identification Information Module 20 residing in a computer system 22. The Caller Identification Information Module operates within a system memory device. The Caller Identification Information Module, for example, is shown residing in a memory subsystem 24. The Caller Identification Information Module, however, could also reside in flash memory 26 or peripheral storage device 28. The computer system also has one or more central processors 30 executing an operating system. The operating system, as is well known, has a set of instructions that control the internal functions of the computer system. A system bus 32 communicates signals, such as data signals, control signals, and address signals, between the central processor and a system controller 34 (typically called a "Northbridge"). The system controller provides a bridging function between the one or more central processors, a graphics subsystem 36, the memory subsystem, and a PCI (Peripheral Controller Interface) bus 38. The PCI bus is controlled by a Peripheral Bus Controller 40. The Peripheral Bus Controller (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller could also include an audio subsystem 54.

The processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other manufacturers also offer microprocessors. Such other manufacturers include Motorola, Inc. (1303 East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054).

The preferred operating system is WINDOWS® (WINDOWS® is a registered trademark of Microsoft Corporation, One Microsoft Way, Redmond Wash. 98052-6399, 425.882.8080). Other operating systems, however, axe also suitable. Such other operating systems would include the UNIX® operating system (UNIX® is a registered trademark of the Open Source Group), the UNIX-based Linux operating system, WINDOWS NT®, and Mac®) OS (Mac® is a registered trademark of Apple Computer, Inc., 1 Infinite Loop, Cupertino, Calif. 95014, 408.996.1010).

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical Customer Interface (GUI). The Graphical Customer Interface typically includes a combination of signals communicated along the keyboard port 42 and the mouse port 44. The Graphical Customer Interface provides a convenient visual and/or audible interface with the customer or user of the computer system 22. As is apparent to those skilled in the art, the selection and arrangement of the audio caller identification information may be programmed over a variety of alternate mediums, such as, for example, a voice-activated menu prompt, an interactive session with an telecommunications network administrator, and the like.

FIG. 2 is a schematic showing the Caller Identification Information Module operating within the telecommunications system 56. The telecommunications system may include wired, optical, and/or wireless elements. This telecommunications system further represents an operating environment for the Caller Identification Information Module 20. The Caller Identification Information Module operates within the memory (such as memory subsystem 24, flash memory 26, or peripheral storage device 28 shown in FIG. 1) of the computer system 22. The Caller Identification Information Module could alternatively operate with the memory of an Internet Protocol (IP) phone, other IP communications devices, and IP addressable wireless devices capable of delivering audio communications (e.g., MP3 player). The telecommunications system includes a telecommunications switch 60 of the PSTN 62. Alternatively, the telecommunications system may include private network elements, such as private branch exchanges (PBXs), and/or other elements. The telecommunications switch includes Advanced Intelligent Network (AIN) componentry 64 controlling many features of the telecommunications switch. The telecommunications switch could also include a packet-based "soft switch" that uses software control to provide voice, data, and video services by dynamically changing its connection data rates and protocols types. If the telecommunications system 56 should include a softswitch, the AIN componentry is replaced by an application server that interfaces with the softswitch via a packet protocol, such as Session Initiation Protocol (SIP). The computer system may also interface with a data network 66 via a connection to the telecommunications switch. The signaling between the telecommunications switch, the PSTN including the AIN, and the data network, however, are well understood in the art and will not be further described. Those of ordinary skill in the art will be able to apply the principles of the invention to their own network configurations which may differ substantially from the telecommunications system as shown in FIG. 2.

Figure 3:
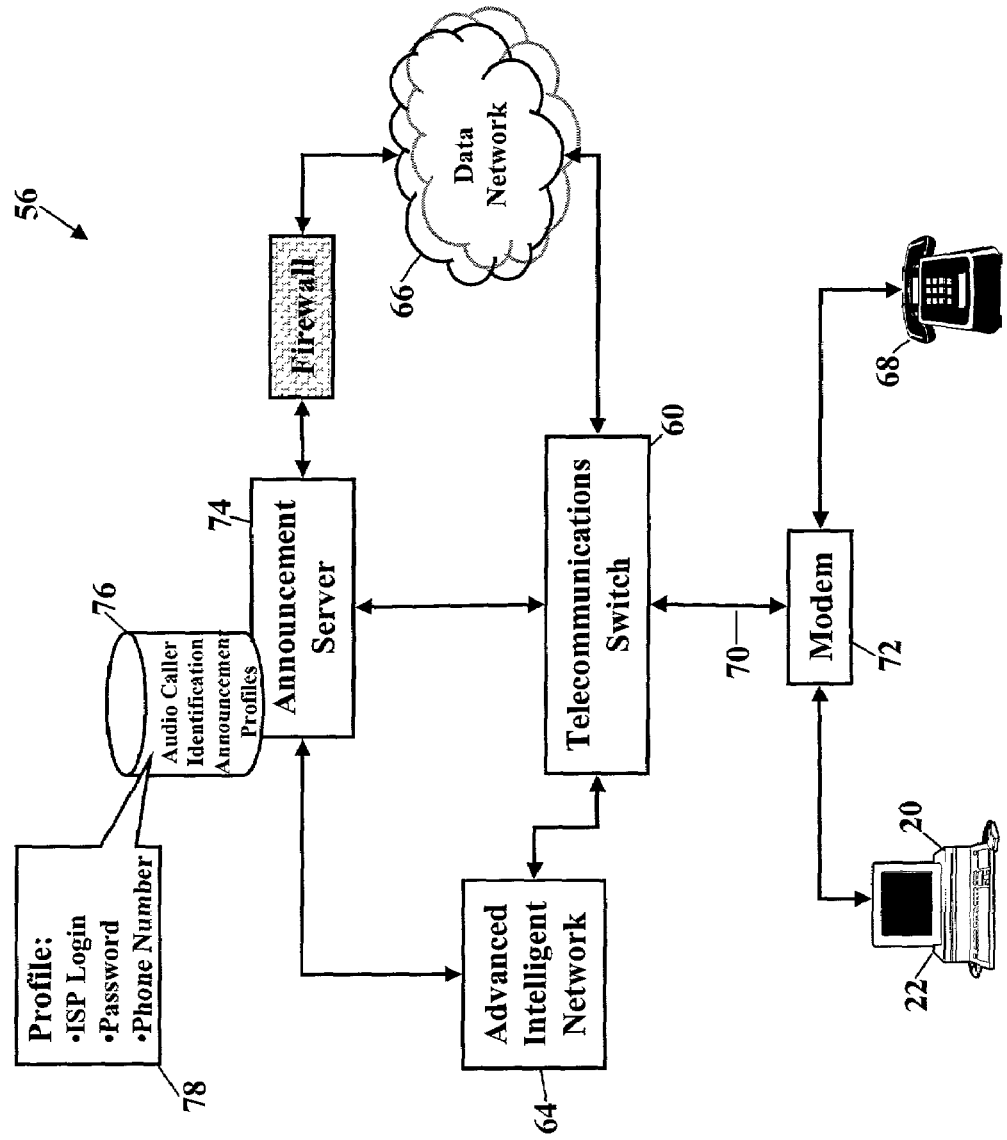
FIG. 3 is a detailed schematic of the telecommunications system shown in FIG. 2.

FIG. 3 is a more detailed schematic of the telecommunications system 56 shown in FIG. 2. FIG. 3 illustrates how the Caller Identification Information Module 20 may be used to establish an audio caller identification announcement to the computer system 22 or the called telephone number. The computer system and the called telephone 68 communicate with the telecommunications switch 60 via a connection 70 to a cable/DSL modem 72. Alternatively, the telecommunications switch may establish the connection via a dial-up modem (not shown). The computer system thus receives packetized data messages from the data network 66 via the connection to the telecommunications switch, while the telephone receives the incoming telephone call via the connection to the telecommunications switch. The Caller Identification Information Module may, therefore, be downloaded via the data network from an announcement server 74. The Caller Identification Information Module is stored, and operates, within the memory of the computer system.

The Caller Identification Information Module 20 is used to establish an audio caller identification announcement profile for the computer system 22. The announcement server 74 stores a database 76 of audio caller identification information profiles. The customer interacts with the Caller Identification Information Module and with the computer system to access the announcement server, to login to the announcement server, and to establish a profile 78 in the database of audio caller identification information profiles. As FIG. 3 shows, the profile could contain, for example, the customer's Internet Service Provider (ISP) login information, a password, and a telephone number servicing the computer system.

Figure 4:
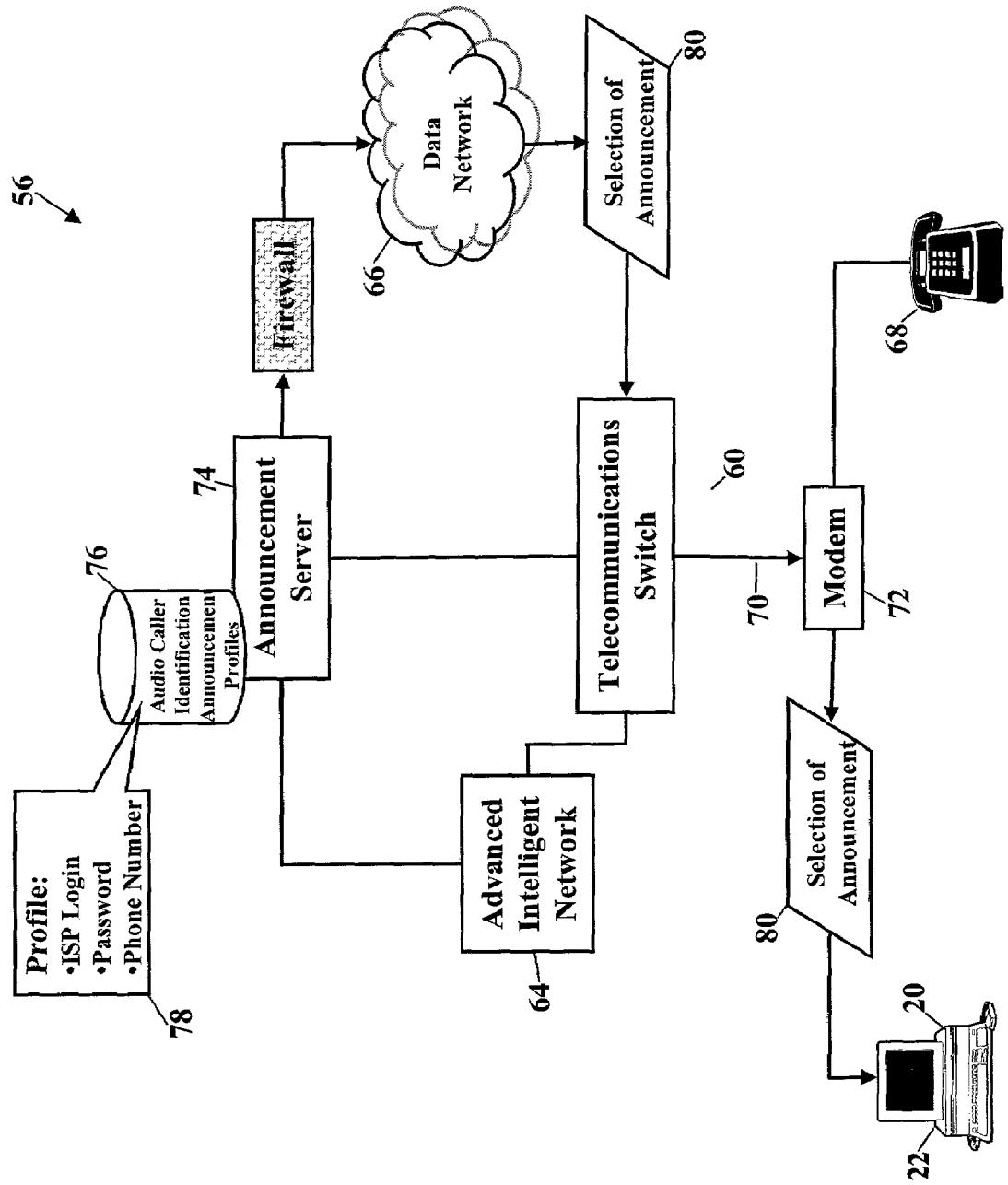
FIG. 4 is a schematic illustrating the selection of announcements according to an embodiment of this invention.

FIG. 4 is a schematic illustrating the selection of announcements. After the customer establishes the profile 78 in the database 76 of audio caller identification announcement profiles, the customer interacts with the Caller Identification Information Module 20 to download a selection 80 of caller identification information fields and/or files associated with those fields. The selection is communicated from the announcement server 74, over the data network 66, through the telecommunications switch 60, and via the connection 70 to the computer system 22. The selection could include a field and/or file associated with at least one of the following an originating telephone number, a name associated with the originating telephone number, a time of day, a date identifier (e.g., day of week or calendar date), a geographic identifier, and/or similar information associated with the ICLID signal. The selection of announcement fields and/or files are then stored within the memory (such as memory subsystem 24, flash memory 26, or peripheral storage device 28 shown in FIG. 1) of the computer system. The selection preferably resides in the same directory structure as the Caller Identification Information Module.

Figure 5:
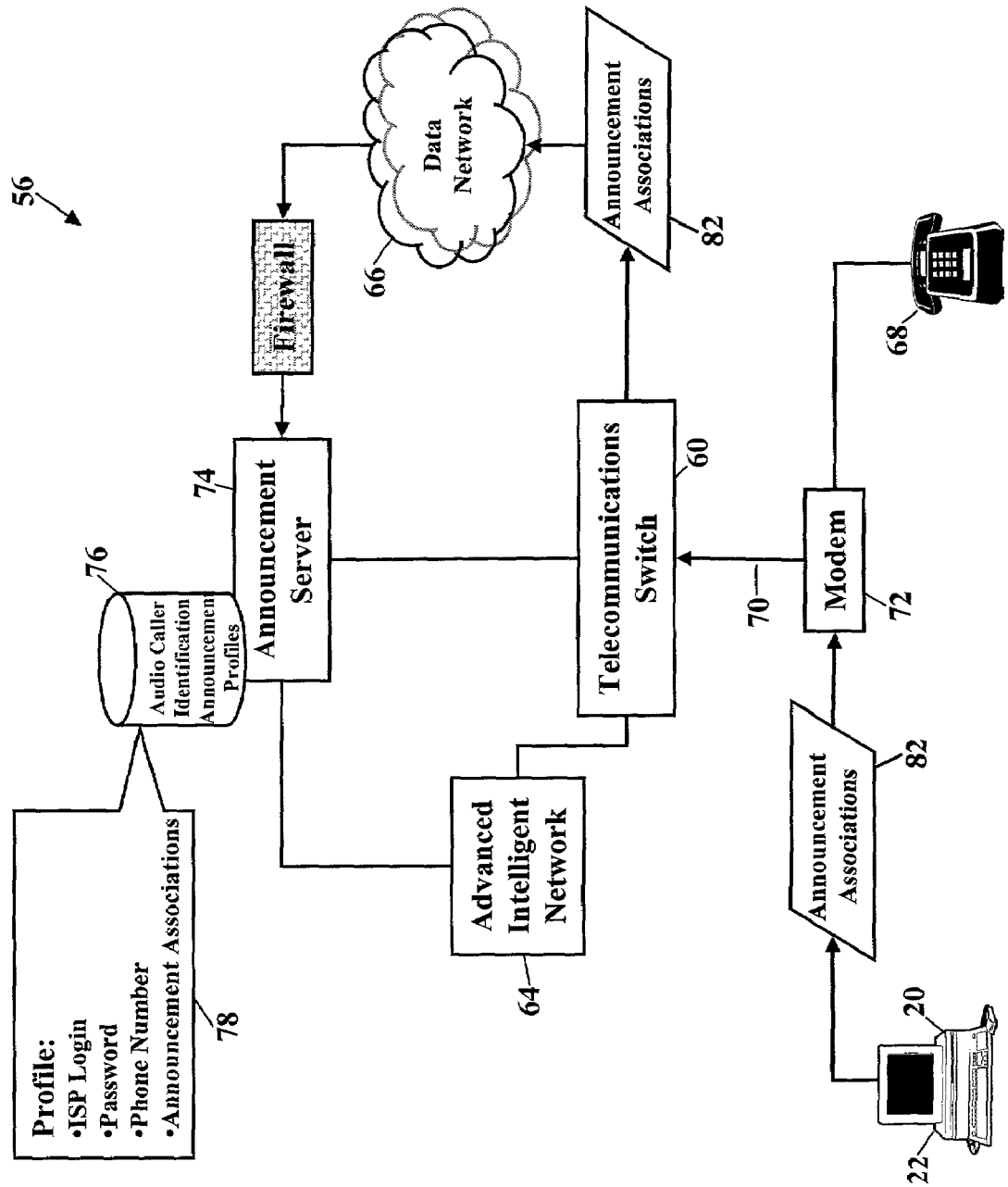
FIG. 5 is a schematic showing that the customer may customize the announcements according to an embodiment of this invention.

FIG. 5 is a schematic showing that the customer may customize the announcements. After the customer has downloaded his/her selection of announcement fields and/or files (shown as reference numeral 80 in FIG. 4), the customer interacts with the Caller Identification Information Module 20 to customize his/her announcements. The Caller Identification Information Module, in other words, allows the customer to select which announcement is played and under what conditions that announcement is played. The Caller Identification Information Module allows the customer to select a variety of factors, such as, for example, different caller identification information profiles based upon the time of day and/or the day of week. The customer, for example, could select a first distinctive audio caller identification announcement profile for calls received between 8:00 AM-12:00 PM EST each morning, while a second distinctive announcement profile is selected for calls received only on Friday afternoons. The Caller Identification Information Module also allows the customer to associate an audio caller identification announcement profile with a particular originating telephone number (i.e., an incoming called from a calling party). The customer, for example, could select a third distinctive announcement profile when the calling party is a work phone number, a fourth distinctive announcement profile when the calling party is a spouse's cell phone number, and a fifth distinctive announcement profile when the calling party is a grandparent's phone number. The Caller Identification Information Module further allows the customer to select unique audio caller identification announcement profiles and/or call handling options for unlisted telephone numbers, for CallerID-Blocked telephone numbers, for "private" telephone numbers, for "out-of-area" telephone numbers, and other incoming calls that are not associated (or have a limited association) with caller identification information. Once the customer has customized the announcement profiles, the Caller Identification Information Module communicates announcement associations 82 to the announcement server 74. The announcement associations represent the customer's customized announcement profiles. The announcement associations are communicated via the connection 70, through the telecommunications switch 60, over the data network 66, and to the announcement server. The profile 78 is then updated with the customer's announcement associations.

Figure 6:
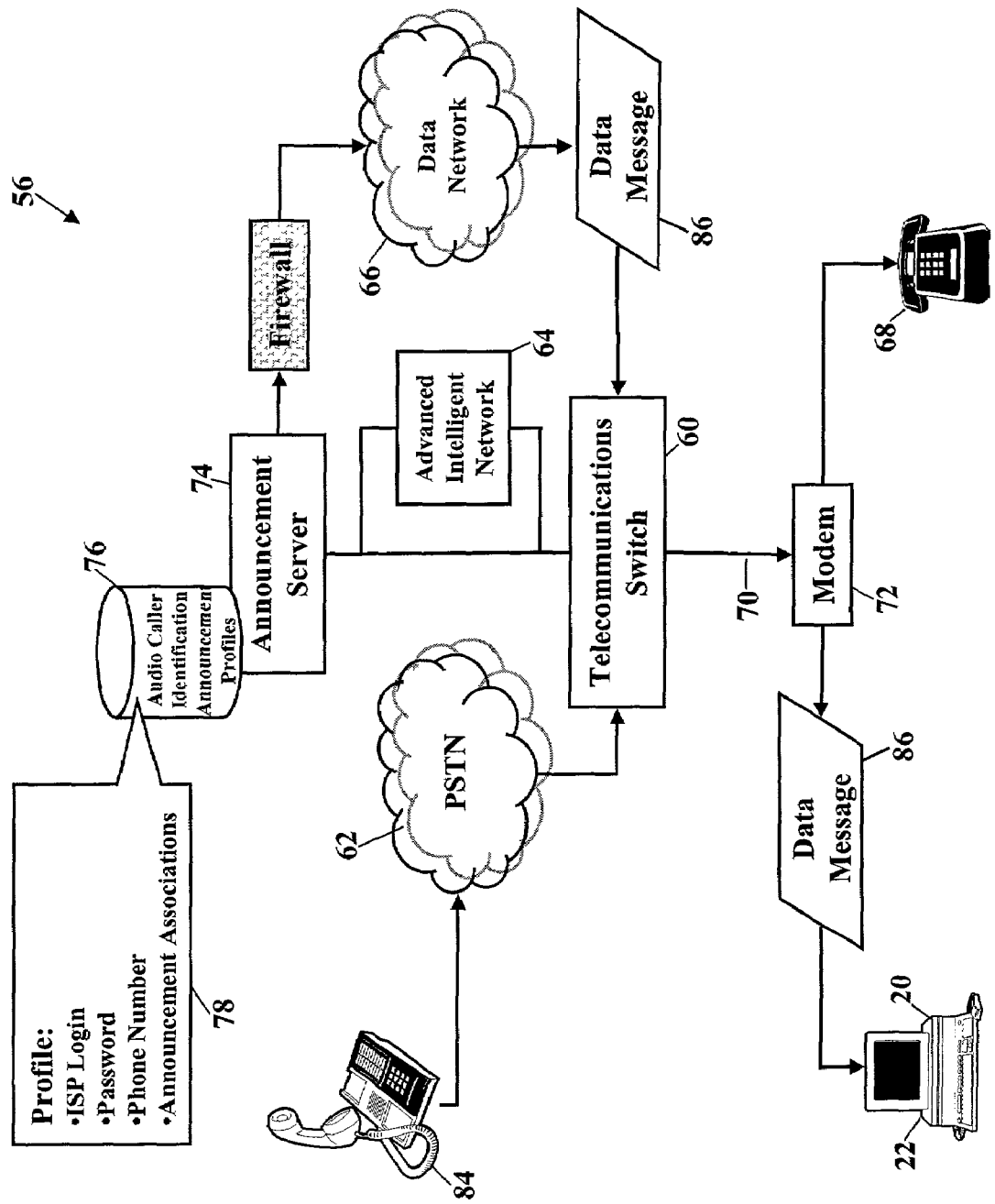
FIGS. 6 and 7 are schematics illustrating the processing of an incoming call to a called telephone number according to an embodiment of this invention.

FIG. 6 is a schematic illustrating the processing of an incoming communications signal. A calling party uses a communications device at an originating telephone number to place a call to the called telephone 68. FIG. 6 shows the communications device as a second telephone 84. The call is routed from the second telephone and into the PSTN 62. If, on the other hand, the communications device is a wireless device, the call is transmitted to an antenna (not shown), then coupled to a mobile switch (also not shown), and then routed into the PSTN. The PSTN routes the call to the local central office telecommunications switch 60 serving the called telephone. The intelligence controlling the telecommunications switch (such as the Advanced Intelligence Network 64) detects that customized announcement service is required (the AIN environment, for example, would detect a trigger for customized announcement service). The call is suspended and a query is sent to the announcement server 74 for the appropriate announcement after the incoming communications signal is decoded to associate caller identification information, such as a name associated with the originating telephone number. The announcement server accesses the customer's profile 78, reads the customer's announcement associations 82, and populates the fields and/or files for the incoming communications signal.

Once the appropriate announcement is selected, the announcement server 74 then requests the appropriate announcement profile format and associates the information for the audio caller identification announcement. If the customer has a static Internet Protocol (IP) address for the computer system 22, this static IP address will usually be known from the customer's profile 78. The announcement server, therefore, sends the data message 86 to the computer system. The data message includes information associated with the selected announcement. The data message is addressed to the IP address of the computer system or to another IP communications device (not shown). The data message is routed over the data network 66, through the telecommunications switch 60, and to the computer system via the connection 70 and the modem 72. The data message includes information associated with the decoded ICLID signal of the incoming communications signal. The Caller Identification Information Module 20 receives the data message 86 and retrieves the selected announcement fields and/or files from the memory of the computer system. The selected announcement fields and/or file are then audibly played by the computer system. Once the selected announcement is played at the computer system, the telecommunications switch then resumes processing the call. The incoming communications signal is routed to the called telephone 68 via the connection and the modem.

The customer may also specify when the audio caller identification announcement is presented. The customer may have the Caller Identification Information Module 20 present the announcement prior to receipt of the incoming communications signal (i.e., incoming call) at the called telephone 68. If the announcement is presented prior to the incoming call, the announcement would give the customer advance notice of the caller identification information. The customer could, alternatively, have the Caller Identification Information Module present and play the announcement at the computer system 22 along with presenting the incoming call to the called telephone.

The computer system 22 plays the selected announcement. The selected announcement fields and/or file may reside in the computer system, and the data message 86 tells the Caller Identification Information Module 20 which announcement to play. Alternatively, the selected announcement fields and/or files may reside in a database server (not shown) of the telecommunications system. The data message may include any protocol that is appropriately understood by for the announcement server 74, the data network 66, the computer system, and the Caller Identification Information Module. Once the data message is received, the Caller Identification Information Module and the computer system present and play the audio caller identification announcement (based on the audio caller identification announcement profile) so that a nearby customer or user is audibly alerted of the caller identification information. The Caller Identification Information Module and the computer system, for example, could cause the announcement to be audibly presented over a pair of speakers.

Figure 7:
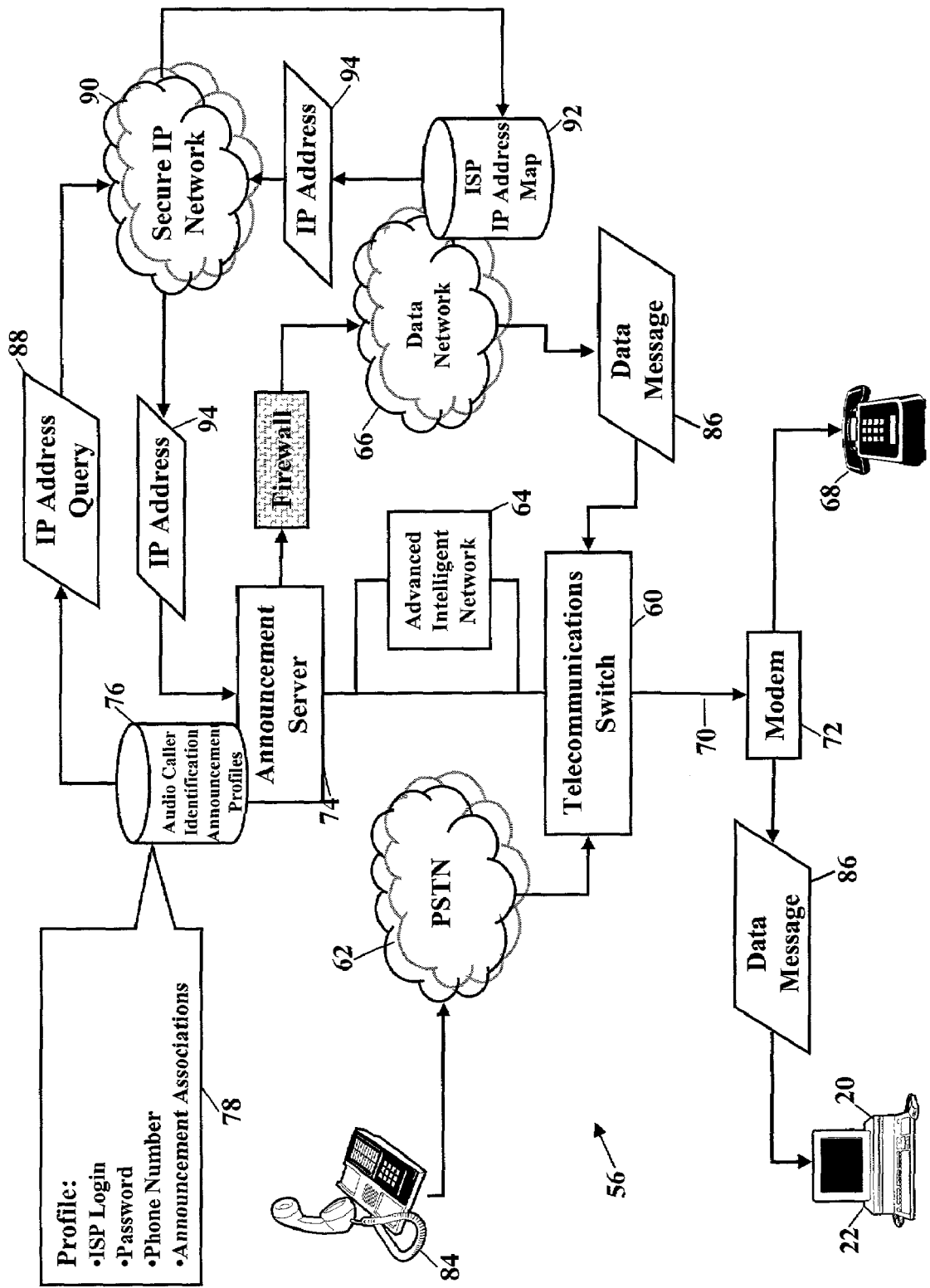

FIG. 7 is a schematic illustrating the processing of the incoming call to the called telephone number in another embodiment of this invention. FIG. 7 differs from FIG. 6, however, in that FIG. 7 illustrates a call flow for dynamic IP addressing. Some Internet Service Providers assign a "static" IP address to a customer's account, whereas other Internet Service Providers dynamically change a customer's IP address. A static IP address is permanently assigned to the customer, while a dynamic IP address may change with each login or may dynamically change during a session. FIG. 7 illustrates additional queries that are made for dynamic IP addressing.

FIG. 7 similarly routes the call as shown in FIG. 6. The call routes from the second telephone 84, into the PSTN 62, and to the local central office telecommunications switch 60 serving the called telephone number. The intelligence controlling the telecommunications switch detects a request for customized announcement service and the call is suspended. A query is sent to the announcement server 74 for the appropriate announcement. The announcement server accesses the customer's profile 78, reads the customer's announcement associations, and selects which announcement is appropriate. Once the appropriate announcement is selected, the announcement server then prepares to send the data message 86 to the computer system 22. The data message includes the fields and/or files associated with the audio caller identification announcement profile of the originating telephone number.

Before the data message 86 can be sent, however, the dynamic IP address of the computer system 22 must be determined. An IP address query 88 is sent from the announcement server 74, routed over a secure IP network 90, and to an ISP serving the computer system. The IP address query requests the current IP address assigned to the computer system. FIG. 7 shows the current IP address being retrieved from a database 92 that maps telephone numbers to IP addresses. The current IP address, for example, could be mapped to the ISP login information. If the ISP login information contained within the profile 78 matches the ISP's login information, then the announcement server could have access to the database.

Regardless of how the IP address is accessed, the current IP address 94 is returned. The current IP address routes over the secure IP network 90 and to the announcement server 74. With the current IP address known, the announcement server may now send the data message 86. The data message, including fields and/or files associated with the selected announcement, is sent to the IP address of the called telephone number and to the computer system 22. The data message routes over the data network 66, through the telecommunications switch 60, and to the computer system via the connection 70. The Caller Identification Information Module 20 receives the data message, retrieves the selected announcement file (or receives the selected announcement files, if the files are sent by the telecommunications network), and then the audio caller identification announcement is played by the computer system.

Figure 8:
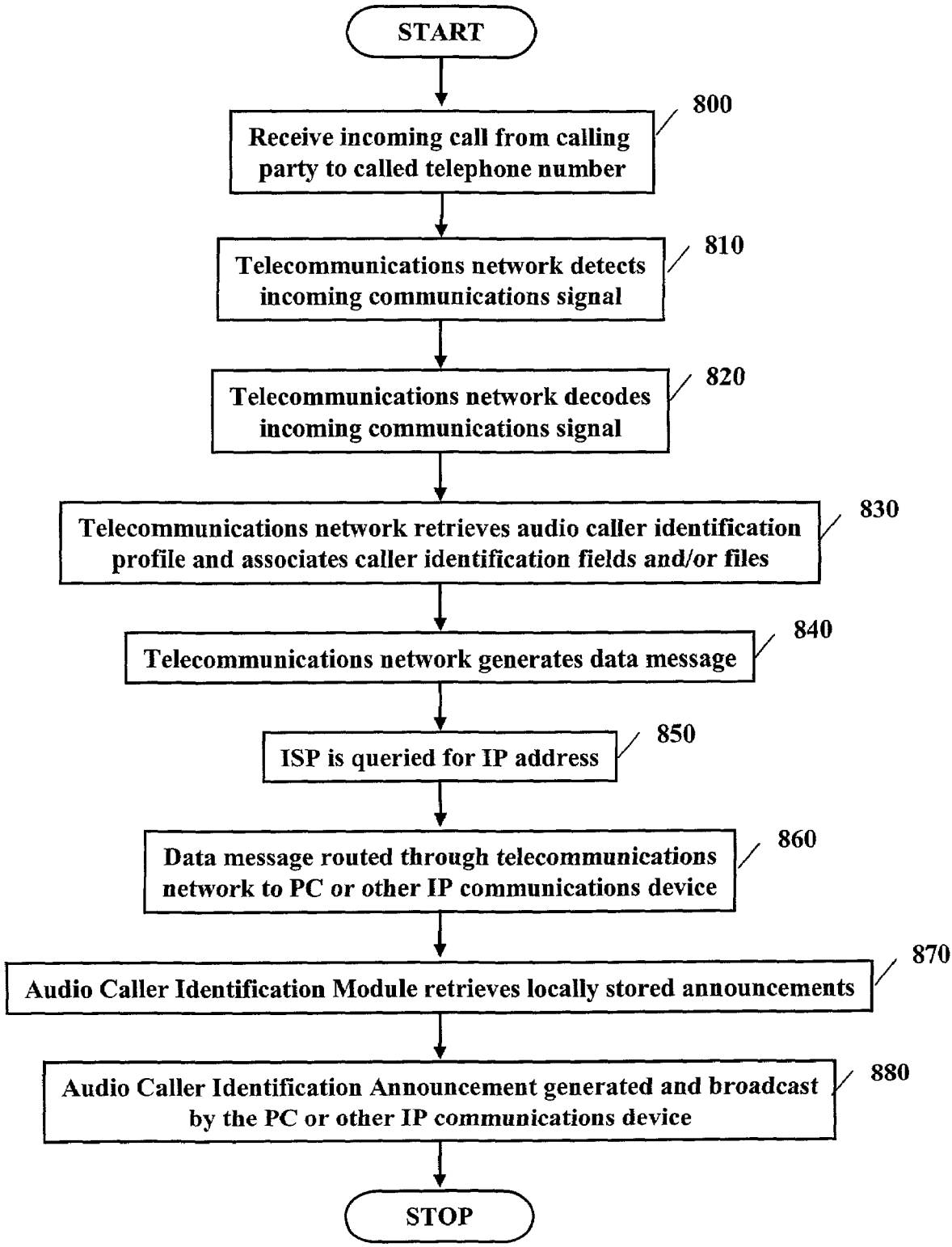
FIG. 8 is a flowchart of an overview of a communications method for audio delivery of caller identification information to a PC or other IP communications device according to an embodiment of this invention.

FIG. 8 illustrates a flowchart showing an overview of a process for audio delivery of caller identification information to a PC or other IP communications device according to an embodiment of this invention. The calling party places a call to a called telephone number (block 800). The telecommunications network 68 recognizes the incoming communications signal to a subscribing customer (block 810), decodes the incoming communications signal (e.g., decodes the ICLID and other network data associated with the originating telephone number) (block 820), and obtains the audio caller identification information profile and associated fields and/or files for the incoming communications signal (block 830). Next, this information is processed to generate the data message capable of being sent to the computer system 22 (block 840). Included in this data message is ICLID and other network data, such as calling name, as determined from the Intelligent Network. The ISP is queried, if needed, for an IP address of the called telephone number (block 850). The data message is sent through the telecommunications network (via the switch) to the PC or other IP communications device (block 860), with the data message including information associated caller identification information. The PC or other IP communications device retrieves any locally stored associated caller identification information announcement fields and/or files (block 870) and generates an audio caller identification announcement that is played by the PC or other IP communications device (880). Further, the telecommunications switch connects the incoming call to the called telephone number via a connection to a telephone (block 890).

In an alternate embodiment (not shown), if the audio caller identification announcement is not enabled (or if an ICLID signal cannot be associated with the originating telephone number), then the telecommunications network may select a default announcement. For example, the telecommunications network may announce that the information is "private," "not available," "blocked," or "declined." As used herein, the term "private" refers to a private or restricted originating telephone number, such as, for example, an unlisted number. As used herein, the term "not available" refers to an originating telephone number that cannot be decoded by the telecommunications network. As used herein, the term "blocked" refers to a telephone number that is blocked by a calling party so that the originating telephone number is not provided. As used herein, the term "declined," refers to a calling party that opts out of providing the audio announcement discussed above.

Figure 9:
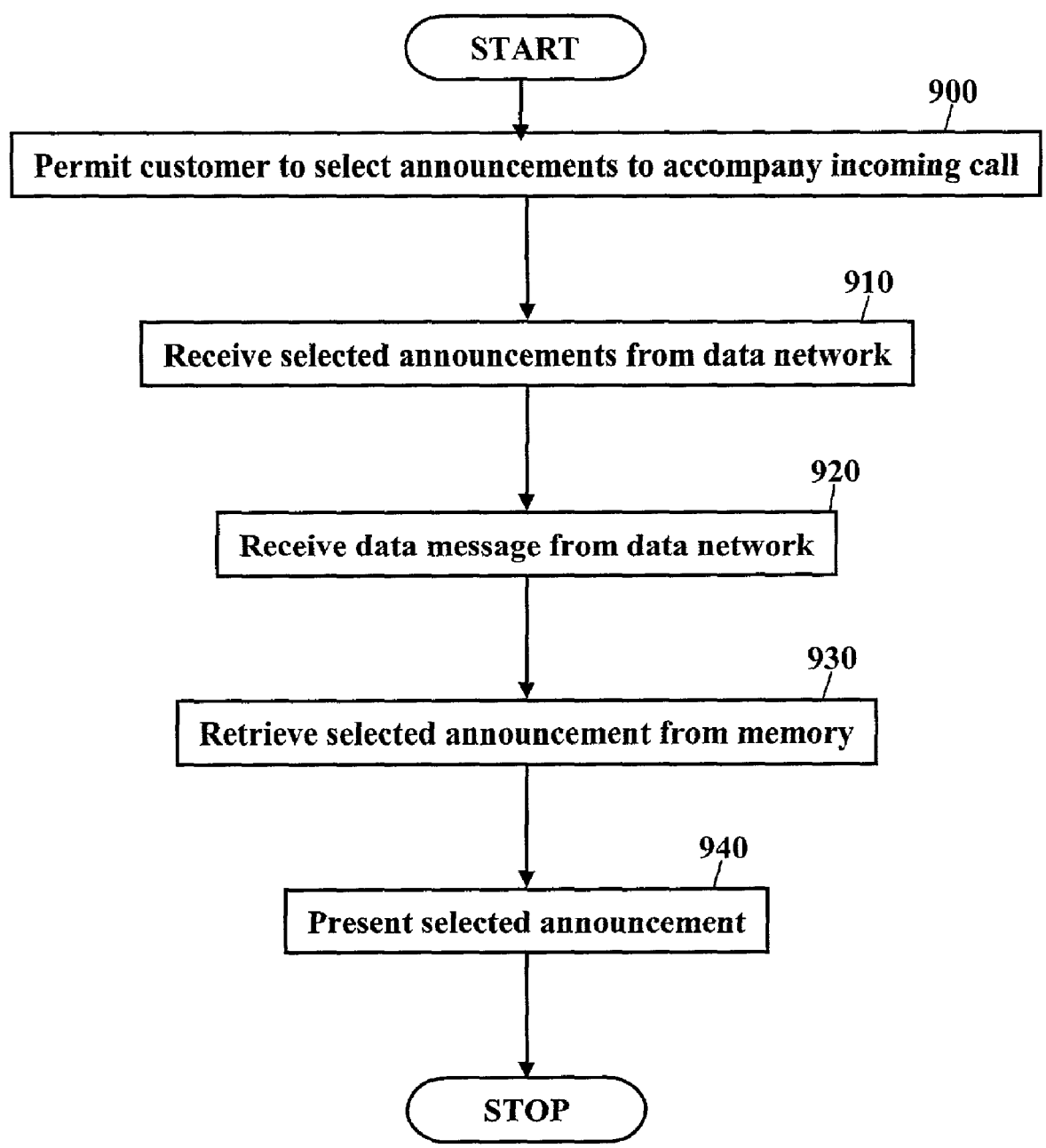
FIG. 9 is a flowchart showing an alternative communications method for audio delivery of caller identification information according to another embodiment of this invention.

FIG. 9 is a flowchart showing an alternative method of providing audio caller identification announcements to a called telephone number. This alternative method represents an embodiment of the Caller Identification Information Module (shown as reference numeral 20). A customer is permitted to select announcements fields and/or files to accompany an incoming call to the called telephone number (block 900). The selected announcement(s) is downloaded and received from a data network (block 910). When the appropriate announcement is processed to accompany the incoming communications signal, the Caller Identification Information Module receives a data message from the data network (block 920). The data message tells the Caller Identification Information Module which announcement is to be presented. The Caller Identification Information Module retrieves the selected announcement from memory (block 930) and presents the selected announcement to play with the incoming call (block 940).

While the processes in FIGS. 8 and 9 are shown in series, these processes may occur in different orders and/or at simultaneous times as one of ordinary skill in the art will understand. Further, while the disclosed system and methods indicate that a data message is sent to the PC or IP communications device to associate with locally stored data fields and/or files, the audio caller identification announcement may also be generated by the telecommunications network and sent directly to the PC or IP communications device to be played. In another embodiment, the customer may opt to activate a call handling feature after hearing the audio caller identification announcement. For example, call handling may allow the customer to accept the call, allow the customer to send the call to voicemail, allow the customer to send the calling party a message that the customer is unavailable to take the call, forward the incoming communication to another telephone number, or reject the call.

Figure 10:
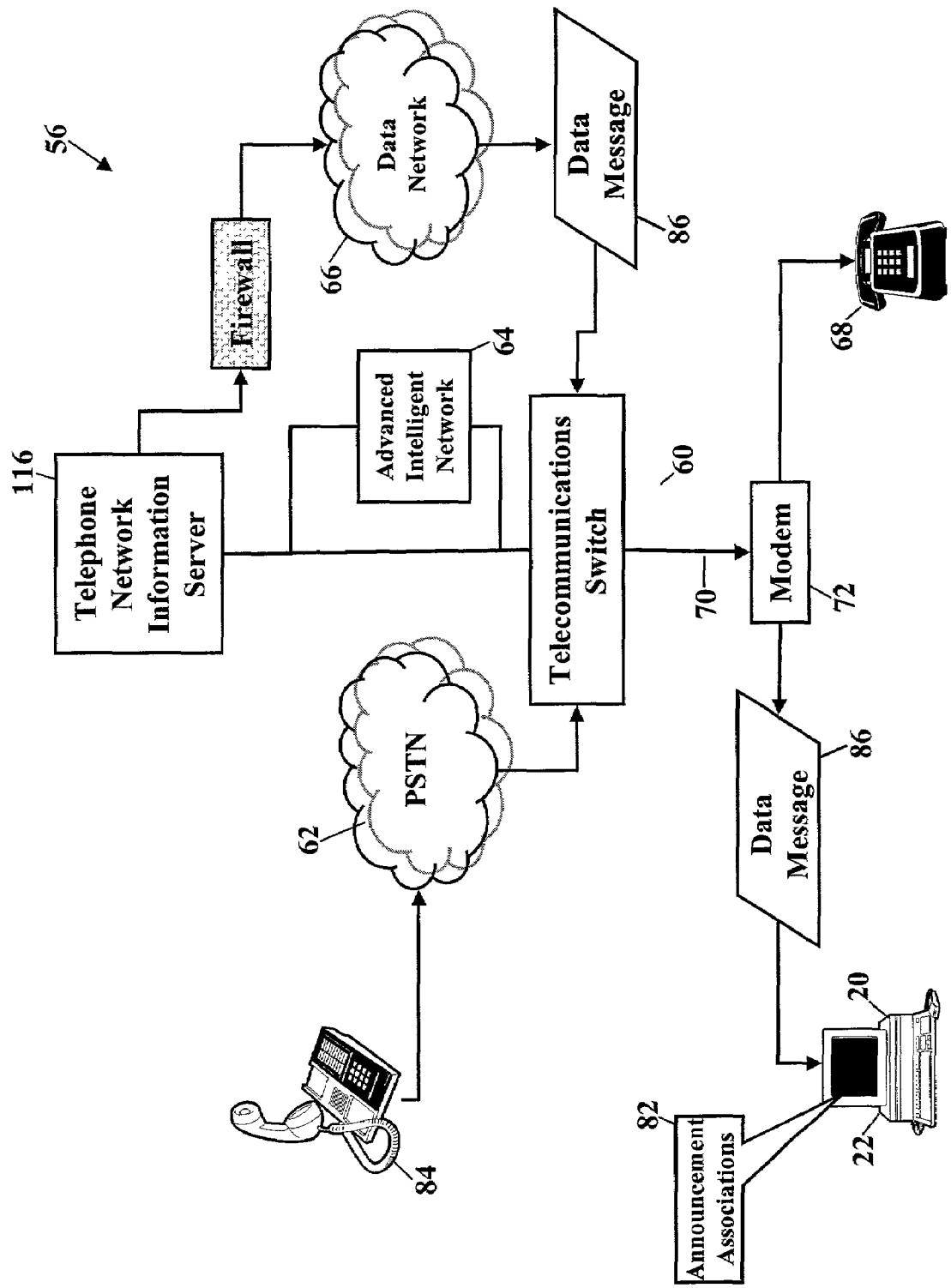
FIG. 10 is a schematic showing the Caller Identification Information Module according to an alternate embodiment of this invention.

FIG. 10 is a schematic showing another embodiment for the Caller Identification Information Module 20. This alternative embodiment stores the customer's announcement associations 82 within the memory of the computer system 22. The Caller Identification Information Module 20, again, operates within the memory of the computer system. The incoming communications signal routes from the second telephone 84, into the PSTN 62, and to the local central office telecommunications switch 60 serving the called telephone number. The intelligence controlling the telecommunications switch suspends the processing of the call. A telephone network information server 116 is queried for telephone network information regarding the call. For example, the telephone network information may be associated with the ICLID signal, such as the originating telephone number and other information discussed above. Once the telephone network information is known, the telephone network information server sends the data message 86 to the computer system. The data message includes the telephone network information associated with caller identification information of the incoming call.

The data message 86 is delivered to the IP address assigned to the computer system 22, as previously described. When the Caller Identification Information Module 20 receives the data message, the Caller Identification Information Modules locally accesses the customer's announcement associations. The announcement associations 82, in this embodiment, are stored within the memory of the computer system. The Caller Identification Information Module uses the announcement associations and the telephone network information contained within the data message to construct the audio caller identification announcement to accompany the incoming call. The Caller Identification Information Module could select the appropriate announcement based upon a variety of factors as discussed above, such as, for example, the time of day, the day of the week, and/or the originating telephone number. After the Caller Identification Information Module selects the appropriate announcement, the selected announcement is retrieved from memory and then audibly played by the computer system. The Caller Identification Information Module of this embodiment, therefore, includes logic to select which announcement is appropriate to accompany the incoming call.

FIG. 11 is a block diagram of an apparatus 118 embodying this invention. This apparatus generates an audio caller identification announcement for an incoming communications signal to a called telephone number serviced or coupled with a PC or other IP communications device. The apparatus includes the Caller Identification Information Module 20 operating within a memory device of a digital signal processor 120. The memory device could include internal memory 122 of the digital signal processor, or the memory device could include an external memory device 124 communicating with the digital signal processor. The digital signal processor converts analog signals to digital signals and converts digital signals to analog signals. The digital signal processor could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor are known and, thus, will not be further discussed.

The digital signal processor 120 interfaces with an input/output processor 126. The input/output processor controls system input/output and provides telephony-like control features. A bus 128 provides a signal communication path between the digital signal processor 120 and the input/output processor. The input/output processor is a microprocessor that includes memory (not shown), communication controllers (not shown), and peripheral controllers (not shown). The communication controllers, for example, could control packet-based communications with a data network (shown as reference numeral 66 in FIGS. 2-7 and 10) through a network port 130. The communication controllers could also control packet-based communications with a telecommunications switch (shown as reference numeral 60 in FIGS. 2-7 and 10) through the network port. The peripheral controllers provide an interface with an LCD/LED/CRT display 132 and with telephony-like control features, such as a keypad 134. A clock source 136 provides a system clock for the apparatus 118, and the clock source may also include higher and lower frequency multiples of the system clock depending upon power requirements and power availability. A power management system 138 provides differing power control mechanisms, such as a sleep mode and a low-power mode, to efficiently utilize available power and to reduce thermal management concerns.

The apparatus 118 plays audio caller identification announcement for incoming calls 140. If, for example, the apparatus communicates with the telecommunications switch (shown as reference numeral 60 in FIGS. 2-7 and 10), the Caller Identification Information Module 20 causes the apparatus to play the announcement to alert a nearby customer or user of an incoming call. The network port 130 receives the data message 86 via the communications link (shown as reference numeral 70 in FIGS. 2-7 and 10) to the telecommunications switch. The data message is received from the data network (shown as reference numeral 66 in FIGS. 2-7 and 10). The data message may include information associated with an announcement selected by the telecommunications system (shown as reference numeral 56 in FIGS. 2-7 and 10) to accompany the incoming call. The data message could also include telephone network information (such as that information provided by the telephone network information server 116 of FIG. 10) provided by the telecommunications system. When the data message is received, the digital signal processor 120 interfaces with the Caller Identification Information Module and with the internal memory device 122 and/or the external memory device 124. The Caller Identification Information Module instructs the digital signal processor to retrieve the selected announcement from a selection of announcements 142 stored in the memory device. The announcement is selected based upon the information contained within the data message as previously discussed.

Once the announcement is selected, the apparatus 118 generates the audio caller identification announcement. The digital signal processor 120 interfaces with an announcement generator system 144. The announcement generator system executes the selected announcement fields and/or files and generates the audio caller identification announcement. The digital signal processor and the announcement generator system could also interface with an external speaker/microphone (mic) system 146 to audibly broadcast the selected announcement.

The Caller Identification Information Module (shown as reference numeral 20 in FIG. 1) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-customers, licensees, and assignees. These types of computer-readable media, and other types not mention here but considered within the scope of this invention, allow the Caller Identification Information Module to be easily disseminated. A computer program product for providing custom announcements for telephones comprises the computer-readable medium and the Caller Identification Information Module. The Caller Identification Information Module is stored on the computer-readable medium.

While several implementation of various embodiments of this invention are described herein, various modifications and alternate embodiment will occur to those skilled in the art. Accordingly, this invention is intended to include those other variations, modifications, and alternate embodiments that adhere to the spirit and scope of this invention.

What is claimed is:

1. A method, comprising:
   receiving an incoming call from an originating telephone number to a called telephone number;
   suspending processing of the incoming call;
   querying an announcement server for an audio announcement associated with the called telephone number;
   retrieving a name of the audio announcement for the incoming call and an Internet Protocol address associated with the called telephone number;
   mapping the called telephone number to a telephone number servicing the Internet Protocol address when the called telephone number and the Internet Protocol address are serviced by different telephone numbers; and
   sending a data message to the Internet Protocol address along with resuming processing of the incoming call to the called telephone number, the data message identifying the name of the audio announcement to be retrieved from memory of a device at the Internet Protocol address.

2. The method of claim 1, further comprising connecting the incoming call with the called telephone number.

3. The method of claim 1, further comprising:
   querying for a dynamic IP address associated with the called telephone number, the dynamic IP address comprising a currently connected IP address for accessing the communications device.

4. The method of claim 1, further comprising matching a parameter of the incoming call with an audio caller identification announcement profile, the parameter comprising:
   (a) the originating telephone number;
   (b) a name associated with the originating telephone number;
   (c) a time identifier that the incoming call is first detected;
   (d) a date identifier that provides the date that the incoming call is received; and
   (e) a geographic identifier of the originating telephone number.

5. The method of claim 1, further comprising accessing a database of audio caller identification announcement profile data specifying times during which the audio announcement is not played and specifying other times during which the incoming call is not processed to the called telephone number.

6. The method of claim 1, further comprising receiving a reply message from the Internet Protocol address to not link the incoming call to the called telephone number.

7. The method of claim 6, in response to the reply message, then further comprising forwarding the incoming call to voicemail.

8. The method of claim 6, in response to the reply message, then further comprising playing a recorded message.

9. The method of claim 6, in response to the reply message, then further comprising declining the call.

10. The method of claim 1, further comprising means for performing a default function.

11. A system, comprising:
    means for receiving an incoming call from an originating telephone number to a called telephone number;
    means for suspending processing of the incoming call;
    means for querying an announcement server for an audio announcement associated with the called telephone number;
    means for retrieving a name of the audio announcement for the incoming call and an Internet Protocol address associated with the called telephone number;
    means for mapping the called telephone number to a telephone number servicing the Internet Protocol address when the called telephone number and the Internet Protocol address are serviced by different telephone numbers; and
    means for sending a data message to the Internet Protocol address along with resuming processing of the incoming call to the called telephone number, the data message identifying the name of the audio announcement to be retrieved from memory of a device at the Internet Protocol address.

12. The apparatus of claim 11, further comprising means for connecting the incoming call with the called telephone number.

13. The apparatus of claim 11, further comprising means for querying for a dynamic IP address associated with the called telephone number, the dynamic IP address comprising a currently connected IP address for accessing the communications device.

14. The apparatus of claim 11, further comprising means for receiving a reply message from the Internet Protocol address to not link the incoming call to the called telephone number.

15. A computer readable medium storing processor executable instructions for performing a method, the method comprising:
    receiving an incoming call from an originating telephone number to a called telephone number;
    suspending processing of the incoming call;
    querying an announcement server for an audio announcement associated with the called telephone number;
    retrieving a name of the audio announcement for the incoming call and an Internet Protocol address associated with the called telephone number;
    mapping the called telephone number to a telephone number servicing the Internet Protocol address when the called telephone number and the Internet Protocol address are serviced by different telephone numbers; and
    sending a data message to the Internet Protocol address along with resuming processing of the incoming call to the called telephone number, the data message identifying the name of the audio announcement to be retrieved from memory of a device at the Internet Protocol address.

* * * * *